Nov. 30, 1937.  E. S. PAISLEY ET AL  2,100,610

GAS FILTER

Filed June 15, 1936

INVENTORS
Ellwood S. Paisley &
BY Allen F. Peters.
*Stuart Freeman*
ATTORNEY

UNITED STATES PATENT OFFICE 2,100,610

GAS FILTER

Ellwood S. Paisley and Allen F. Peters, Philadelphia, Pa., assignors to The National Drug Company, Philadelphia, Pa., a corporation of Pennsylvania Application June 15, 1936, Serial No. 85,253

5 Claims. (Cl. 183—49)

The object of the invention is to provide improvements in filters broadly, but more particularly in that type which is especially adapted from its general size and construction, to remove solids, at least, from the air or other gases which enter and relieve the vacuum in a reservoir-container, such as is designed for the application of sterile dextrose, saline and other fluent substances in intravenous, hypodermoclysis and venoclysis use.

Another object is to provide a compact yet highly efficient filter, which as an independent unit can be inserted into or withdrawn from the rubber or similar closures, by means of which the reservoir-containers are hermetically sealed, and which is inexpensive to manufacture and replace.

A further object is to provide a filter of this type, in which the filter medium is restrained between two spaced gaskets, carried by the rear end portion of a hollow stylus or canula, and cooperating to form a plunger or piston within a surrounding glass tube, having its opposite end closed, and means being provided whereby said stylus or canula is inserted through or is withdrawn from a stopper closure without the plunger or piston-like structure being accidentally withdrawn from or forced farther into said tube.

Still another object is to provide a filter, in which the in-flowing and out-flowing air passes along parallel paths; in which the normal upper end of the filter lies relatively closely adjacent to and is sheltered by the container closure to which it is connected; and from which liquid, accidentally entering or condensing within said filter, will tend to flow from the interior thereof by way of the canula bore, instead of entering and wetting the filter medium, and thereby deteriorating the same and making it at least temporarily incapable of freely passing a gas.

Figure 1:
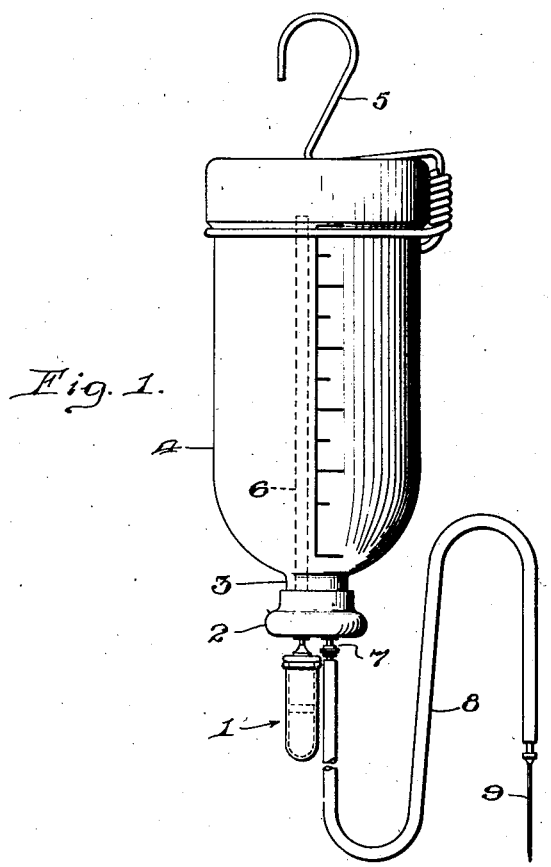
Figure 2:
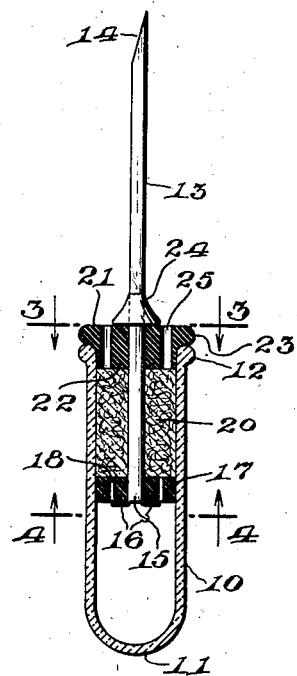
Figure 3:
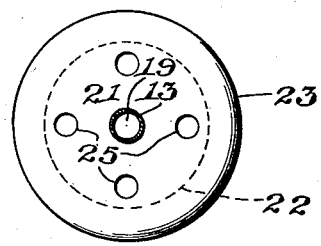
Figure 4:
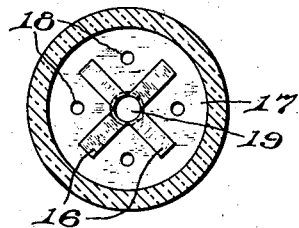

With these and other objects in mind, the invention comprises further details of construction and operation, such as are fully brought out in the following description, when read in conjunction with the accompanying drawing, in which Fig. 1 is an elevational view of the device as operatively associated with a reservoir-container and liquid-dispensing means, as employed in intravenous, hypodermoclysis and venoclysis injections; Fig. 2 is an enlarged vertical diametrical section of the improved filter per se; Fig. 3 is a transverse section of the line 3—3 of Fig. 2; and Fig. 4 is a transverse section on the line 4—4 of Fig. 2.

Referring to the drawing, one embodiment of the invention is shown as comprising a filter 1, which is attached, as hereinafter described, to the resilient closure 2, carried by the neck 3 of a suitable reservoir-container 4, which in turn is supported operatively by any suitable means 5, said filter being operative to filter and remove solid particles from air or other gases entering said container through said closure, and passing towards the upper portion of the interior of said container by way of a suitable tube 6. The liquid contents of such container are adapted to flow therefrom through said closure by way of a suitable connection, such, for instance, as a hollow canula or stylus 7, thence through a flexible tube 8 and possibly other apparatus, and finally from a hypodermic needle or equivalent discharge nozzle or other medium 9.

The improved filter itself comprises, in one embodiment, a hollow cylindrical tube 10, closed at its normally lower end 11, and provided upon its normally upper edge portion with a flange or beading 12, so as to comprise a casing which is of the same general shape as that of a small size test-tube. A hollow tube 13, pointed at its free end 14, comprises a modified form of canula, and is positioned so that its opposite end 15 extends co-axially into said casing 10 a considerable distance, but not entirely as far as the end wall 11. The inner end 15 of said canula is provided with any convenient form of enlargement, such, for instance, as being split and its resulting fingers 16 deflected in radially opposite directions, as shown in Figs. 2 and 4, to form a stop or limiting means against which is positioned a rubber gasket 17, having a suitable number of spaced apertures 18, the aggregate area of which apertures is preferably less than the cross sectional area of the bore 19 of said canula.

Resting upon and compressed to a predetermined degree against said gasket 17, is a cylindrical porous element, which for convenience may comprise concentric layers of gauze or fabric, coiled about the adjacent portion of said canula, to provide a suitable filtering medium 20, maintained in operative position by an enlarged gasket 21, which has a reduced end portion 22 extending into the casing 10, and an enlarged external flanged or beaded portion 23, which rests against the beading 12 of said casing. An intermediate position of said canula is provided with a radial enlargement 24 of substantially conical shape, and so positioned with respect to the terminal fingers 16, as to maintain the gaskets 17 and 21 in fixed predetermined relationship with the filter medium 20 positioned therebetween.

In assembling the elements comprising this improved filter, the double gasket and porous filter medium comprises, in effect, a plunger or piston, which is forced into the casing 10, until its relative movement with respect to said casing is arrested by engagement of the gasket beading 23 with the beading 12, carried by said casing and the pre-determined fixed distance between said gaskets being maintained by said terminal fingers 16 and the radial flange enlargement 24. With such a construction, the casing 10 may be manually gripped and the pointed terminal portion 14 of the canula forced inwardly through the closure 2, which is usually of a highly elastic form of rubber, or equivalent material. Subsequent manual engagement of the intermediate portion of said canula adjacent to but above the flanged enlargement 24, permits said canula to be withdrawn at will from such closure.

In operation, liquid within the reservoir-container 4 descends by gravity through the tube 8 and hypodermic needle or other nozzle 9, the resultant tendency towards a vacuum being relieved within said container by air passing through said filter into the upper portion of said container by way of the tube 6. Such air, in passing through said filter, enters spaced apertures 25 in the gasket 21, thence passes through the filter medium 20 and the apertures 18 of the inner gasket 17. Entering the open space within the casing 10, this filtered air passes reversely along a parallel path through the bore of the hollow canula 13, through the closure 2 and into the tube 6, whence it rises towards the upper portion of the interior of said container.

The apertures 25 in the outer gasket may be of any desired number and size, but by making the aggregate area of the apertures 18 in the center gasket 17, less than the cross-sectional area of the bore of the said canula, upon inverting the improved filter unit as a whole, any liquid which may enter, or moisture which may be condensed within, the open space within said casing 10, will hesitate to pass into the filter medium by way of the apertures 18, but will inherently tend to drain outwardly through the canula bore 19. Such a condition is essential in order to maintain the filter medium in dry condition, as otherwise it will not readily pass air to relieve the vacuum within the container 4, as the liquid contents are withdrawn therefrom.

In interpreting the appended claims, it is to be understood that the particular form of the device hereinbefore described, and illustrated in the accompanying drawing, is merely illustrative of one embodiment of the invention, and that said invention is capable of being modified in many ways, as to the exact details of its construction and operation, without departing from the scope of the appended claims.

Having thus described our invention, what we claim as new and desire to protect by Letters Patent of the United States is:—

1. A filtering device, comprising a hollow chamber closed at one end, a tube extending into the opposite end of said chamber, a porous filtering medium surrounding said tube and closing the space between said tube and the walls of said chamber, an apertured gasket surrounding said tube and preventing said medium from shifting inwardly of said chamber beyond the limit of said tube, and a second apertured gasket spaced with respect to the first, and operative to prevent said medium from shifting outwardly from said chamber beyond the limit of said chamber, said last-named gasket having a radially enlarged portion abutting against the walls of said chamber and operative to prevent said last-mentioned gasket from shifting inwardly of said chamber.

2. A filtering device, comprising a hollow chamber closed at one end, a tube extending into the opposite end of said chamber, a porous filtering medium surrounding said tube and closing the space between said tube and the walls of said chamber, an apertured gasket surrounding said tube and preventing said medium from shifting inwardly of said chamber beyond the limit of said tube, and a second apertured gasket spaced with respect to the first, and operative to prevent said medium from shifting outwardly from said chamber beyond the limit of said chamber, the aggregate area of the apertures in said first gasket being less than the area of the bore of said tube.

3. A filtering device, comprising a hollow chamber closed at one end, a tube extending into the opposite end of said chamber, a porous filtering medium surrounding said tube and closing the space between said tube and the walls of said chamber, an apertured gasket surrounding said tube and preventing said medium from shifting inwardly of said chamber beyond the limit of said tube, and a second apertured gasket spaced with respect to the first, and operative to prevent said medium from shifting outwardly from said chamber beyond the limit of said chamber, said last-named gasket having a radially enlarged portion abutting against the walls of said chamber and operative to prevent said last-mentioned gasket from shifting inwardly of said chamber, the aggregate area of the apertures in said first gasket being less than the area of the bore of said tube.

4. A filtering device, comprising a hollow chamber closed at one end, a pointed canula having its blunt end extending into the opposite end of said chamber and spaced from the side walls thereof, a porous filtering medium surrounding said canula, spaced apertured gaskets surrounding said canula and confining said medium longitudinally, and means carried by said canula to limit the movement of said gaskets, filtering medium and chamber towards the free pointed end of said canula.

5. A filtering device, comprising a hollow chamber closed at one end, a pointed canula having its blunt end extending into the opposite end of said chamber and spaced from the side walls thereof, a porous filtering medium surrounding said canula, spaced apertured gaskets surrounding said canula and confining said medium longitudinally, and means carried by said canula to limit the movement of said gaskets, filtering medium and chamber towards the free pointed end of said canula, and the aggregate area of the apertures in the innermost gasket being less than the bore of said canula.

ELLWOOD S. PAISLEY.
ALLEN F. PETERS.